United States Patent
Min et al.

(10) Patent No.: US 11,876,229 B2
(45) Date of Patent: Jan. 16, 2024

(54) NEGATIVE ELECTRODE AND LITHIUM SECONDARY BATTERY INCLUDING THE SAME

(71) Applicant: LG ENERGY SOLUTION, LTD., Seoul (KR)

(72) Inventors: Ji-Won Min, Daejeon (KR); Seok-Koo Kim, Daejeon (KR); Joon Kwon, Daejeon (KR); Sun-Kyu Kim, Daejeon (KR); Ju-Ri Kim, Daejeon (KR); Kyung-Eun Sun, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 487 days.

(21) Appl. No.: 17/274,590

(22) PCT Filed: Jan. 28, 2020

(86) PCT No.: PCT/KR2020/001304
§ 371 (c)(1),
(2) Date: Mar. 9, 2021

(87) PCT Pub. No.: WO2020/159202
PCT Pub. Date: Aug. 6, 2020

(65) Prior Publication Data
US 2022/0052345 A1 Feb. 17, 2022

(30) Foreign Application Priority Data
Jan. 28, 2019 (KR) .................. 10-2019-0010797

(51) Int. Cl.
*H01M 4/62* (2006.01)
*H01M 4/04* (2006.01)
(Continued)

(52) U.S. Cl.
CPC ........... *H01M 4/62* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 2009/0136846 A1 | 5/2009 | Lee et al. |
| 2013/0236781 A1 | 9/2013 | Oguni et al. |
(Continued)

FOREIGN PATENT DOCUMENTS

| CN | 103311554 A | 9/2013 |
| CN | 109273717 A | 1/2019 |
(Continued)

OTHER PUBLICATIONS

International Search Report (with partial translation) and Written Opinion issued in corresponding International Patent Application No. PCT/KR2020/001304, dated May 19, 2020.
(Continued)

*Primary Examiner* — Wyatt P McConnell
(74) *Attorney, Agent, or Firm* — Bryan Cave Leighton Paisner LLP

(57) ABSTRACT

Disclosed is a negative electrode including: a current collector; a negative electrode active material layer disposed on at least one surface of the current collector, including a silicon-based active material and a conductive material, and containing no binder polymer; and a coating layer disposed on the surface of the negative electrode active material layer and in at least a part of the inside of the pores of the negative electrode active material layer, and containing a coating layer polymer forming a chemical bond with silicon (Si) of the silicon-based active material, wherein the content of the coating layer polymer is 0.3-2 parts by weight based on 100 parts by weight of the negative electrode active material layer, and the coating layer polymer is a mixture of polyacrylic acid with polyvinyl alcohol.

9 Claims, 2 Drawing Sheets

(51) Int. Cl.
   *H01M 4/134*     (2010.01)
   *H01M 4/1395*    (2010.01)
   *H01M 4/36*      (2006.01)
   *H01M 4/38*      (2006.01)
   *H01M 10/0525*   (2010.01)
   *H01M 4/02*      (2006.01)

(52) U.S. Cl.
   CPC ......... *H01M 4/134* (2013.01); *H01M 4/1395* (2013.01); *H01M 4/366* (2013.01); *H01M 4/386* (2013.01); *H01M 10/0525* (2013.01); *H01M 2004/027* (2013.01)

(56) References Cited

U.S. PATENT DOCUMENTS

| | | | |
|---|---|---|---|
| 2015/0155561 A1 | 6/2015 | Kim et al. | |
| 2016/0172665 A1 | 6/2016 | Zhou et al. | |
| 2018/0108914 A1* | 4/2018 | Seong | H01M 50/461 |
| 2020/0365881 A1* | 11/2020 | Tanaka | H01M 4/621 |

FOREIGN PATENT DOCUMENTS

| | | |
|---|---|---|
| JP | 2001-185126 A | 7/2001 |
| JP | 2010-73339 A | 4/2010 |
| KR | 10-0913176 B1 | 8/2009 |
| KR | 10-2012-0029899 A | 3/2012 |
| KR | 10-2012-0083081 A | 7/2012 |
| KR | 10-2015-0063270 A | 6/2015 |
| KR | 10-1604887 B1 | 3/2016 |
| KR | 10-1618218 B1 | 5/2016 |
| KR | 10-2016-0111738 A | 9/2016 |
| KR | 10-2018-0071147 A | 6/2018 |
| KR | 10-2018-0113375 A | 10/2018 |
| KR | 10-2018-0113376 A | 10/2018 |

OTHER PUBLICATIONS

Extended European Search Report dated Dec. 13, 2021, issued in corresponding European Patent Application No. 20747852.0.
Office Action of Chinese Patent Office in Appl'n No. 202080005670.6, dated Aug. 9, 2023.

* cited by examiner

NEGATIVE ELECTRODE AND LITHIUM SECONDARY BATTERY INCLUDING THE SAME

TECHNICAL FIELD

The present disclosure relates to a negative electrode, and a lithium secondary battery including the same. More preferably, the present disclosure relates to a negative electrode providing improved life characteristics, and a lithium secondary battery including the same.

The present application claims priority to Korean Patent Application No. 10-2019-0010797 filed on Jan. 28, 2019 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having high energy density and voltage, long cycle life and a low discharge rate have been commercialized and used widely.

A lithium secondary battery has a structure having an electrode assembly which includes a positive electrode and a negative electrode each including an active material coated on an electrode current collector, a porous separator interposed between the positive electrode and negative electrode, and a lithium salt-containing electrolyte injected thereto. Each electrode is obtained by applying slurry containing an active material, a binder and a conductive material dispersed in a solvent to a current collector, followed by drying and pressing.

In addition, fundamental characteristics of a lithium secondary battery, such as capacity, output and life, are significantly affected by the negative electrode active material. To maximize the battery characteristics, it is required for a negative electrode active material to have an electrochemical reaction potential near that of lithium metal, to show high reaction reversibility with lithium ions and to provide a high diffusion rate of lithium ions in the active material. As materials satisfying such requirements, carbonaceous materials have been used widely.

Such carbonaceous active materials show high stability and reversibility, but have a limitation in terms of capacity. Therefore, recently, Si-based materials having high theoretical capacity has been used as negative electrode active materials in the fields requiring high-capacity batteries, such as electric vehicles, hybrid electric vehicles, or the like.

However, Si-based negative electrode active materials are problematic in that they undergo a change in crystal structure during lithium intercalation and storage to cause volumetric swelling. Such volumetric swelling causes cracking to cause breakage of active material particles or mis-contact between the active material and a current collector, resulting in the problem of degradation of charge/discharge cycle life of a battery.

DISCLOSURE

Technical Problem

The present disclosure is designed to solve the problems of the related art, and therefore the present disclosure is directed to providing a negative electrode which includes a silicon-based active material and provides improved life characteristics.

The present disclosure is also directed to providing a lithium secondary battery including the negative electrode.

Technical Solution

In one aspect of the present disclosure, there is provided a negative electrode for a lithium secondary battery as defined in any one of the following embodiments.

According to the first embodiment of the present disclosure, there is provided a negative electrode including:
a current collector;
a negative electrode active material layer disposed on at least one surface of the current collector, including a silicon-based active material and a conductive material, and containing no binder polymer; and
a coating layer disposed on the surface of the negative electrode active material layer and in at least a part of the inside of the pores of the negative electrode active material layer, and containing a coating layer polymer forming a chemical bond with silicon (Si) of the silicon-based active material,
wherein the content of the coating layer polymer is 0.3-2 parts by weight based on 100 parts by weight of the negative electrode active material layer, and
the coating layer polymer is a mixture of polyacrylic acid with polyvinyl alcohol.

According to the second embodiment of the present disclosure, there is provided the negative electrode as defined in the first embodiment, wherein the content of the coating layer polymer is 0.5-1.5 parts by weight based on 100 parts by weight of the negative electrode active material layer.

According to the third embodiment of the present disclosure, there is provided the negative electrode as defined in the first or the second embodiment, wherein the coating layer polymer includes polyacrylic acid and polyvinyl alcohol at a weight ratio of 9:1-1:9.

According to the fourth embodiment of the present disclosure, there is provided the negative electrode as defined in any one of the first to the third embodiments, wherein the negative electrode active material layer consists of the silicon-based active material and the conductive material.

In another aspect of the present disclosure, there is provided a method for manufacturing a negative electrode for a lithium secondary battery as defined in any one of the following embodiments.

According to the fifth embodiment of the present disclosure, there is provided a method for manufacturing a negative electrode, including the steps of:
forming a negative electrode active material layer including a silicon-based active material and a conductive material and containing no binder polymer onto at least one surface of a current collector;
coating a composition for a coating layer including a coating layer polymer and a solvent on the surface of the negative electrode active material layer and in at least a part of the inside of the pores of the negative electrode active material layer; and
drying the coated composition for a coating layer at 140-190° C. to form a coating layer in which the coating layer polymer forms a chemical bond with silicon (Si) of the silicon-based active material, wherein the content of the coating layer polymer is 0.3-2 parts by weight based on 100 parts by weight of the negative electrode active material layer, and the coating layer polymer is a mixture of polyacrylic acid with polyvinyl alcohol.

According to the sixth embodiment of the present disclosure, there is provided the method for manufacturing a negative electrode as defined in the fifth embodiment, wherein the content of the coating layer polymer is 0.5-1.5 parts by weight based on 100 parts by weight of the negative electrode active material layer.

According to the seventh embodiment of the present disclosure, there is provided the method for manufacturing a negative electrode as defined in the fifth or the sixth embodiment, wherein the negative electrode active material layer consists of the silicon-based active material and the conductive material.

According to the eighth embodiment of the present disclosure, there is provided the method for manufacturing a negative electrode as defined in any one of the fifth to the seventh embodiments, wherein the step of coating a composition for a coating layer including a coating layer polymer and a solvent on the surface of the negative electrode active material layer and in at least a part of the inside of the pores of the negative electrode active material layer is carried out through dip coating, spray coating, die coating or a combination of at least two of them.

According to the ninth embodiment of the present disclosure, there is provided a lithium secondary battery including the negative electrode as defined in any one of the first to the fourth embodiments.

Advantageous Effects

The negative electrode according to an embodiment of the present disclosure is provided with a coating layer including a mixture of polyacrylic acid with polyvinyl alcohol, as a coating layer polymer, wherein the coating layer polymer, polyacrylic acid and polyvinyl alcohol form crosslinking bonds with the silicon-based active material of the negative electrode active material layer, and polyacrylic acid forms an ester bond with polyvinyl alcohol. In this manner, it is possible to significantly improve the problems related with volumetric swelling of the silicon-based compound and durability.

A binder polymer is used for the conventional negative electrode active material layer. However, according to the present disclosure, a coating layer using a significantly low content of a mixture of polyacrylic acid with polyvinyl alcohol, as a coating layer polymer, is formed on the negative electrode active material layer. Thus, it is possible to prevent the problem of an increased resistance in the negative electrode active material layer itself, and thus to improve the life characteristics of a lithium secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
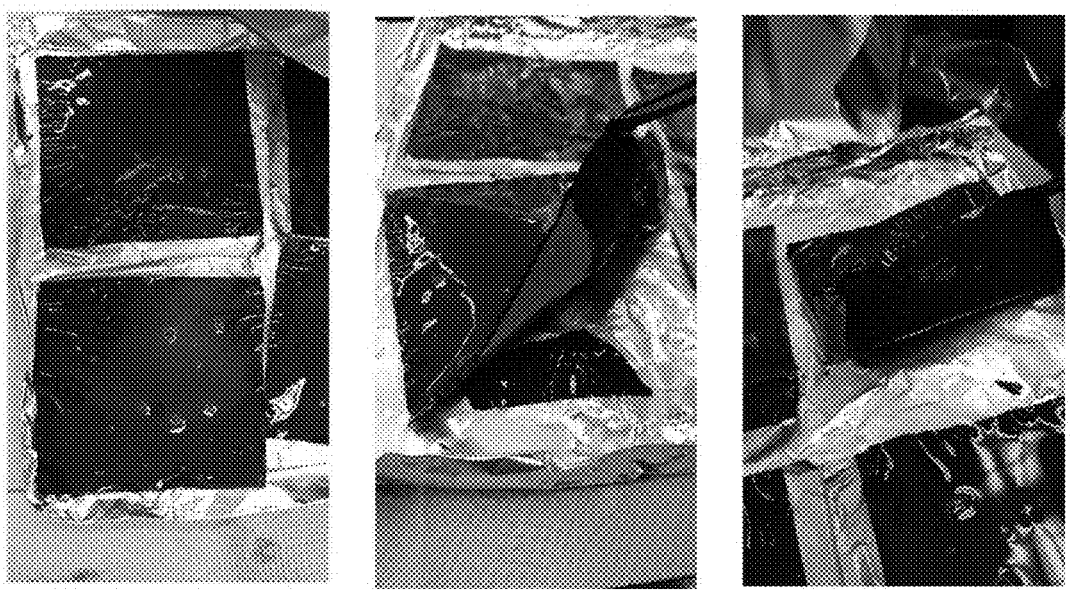
FIG. 1 is a photographic view illustrating the coating layer formed on the preliminary negative electrode obtained by using negative electrode slurry including a binder polymer according to Comparative Example 4.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a negative electrode, including:

a current collector; a negative electrode active material layer disposed on at least one surface of the current collector, including a silicon-based active material and a conductive material, and containing no binder polymer; and a coating layer disposed on the surface of the negative electrode active material layer and in at least a part of the inside of the pores of the negative electrode active material layer, and containing a coating layer polymer forming a chemical bond with silicon (Si) of the silicon-based active material, wherein the content of the coating layer polymer is 0.3-2 parts by weight based on 100 parts by weight of the negative electrode active material layer, and the coating layer polymer is a mixture of polyacrylic acid with polyvinyl alcohol.

The current collector is not particularly limited, as long as it causes no chemical change in the corresponding battery and has conductivity. Particular examples of the current collector may include copper, stainless steel, aluminum, nickel, titanium, baked carbon, copper or stainless steel surface-treated with carbon, nickel, titanium or silver, aluminum-cadmium alloy, or the like. Although the thickness of the current collector is not particularly limited, the current collector may have a thickness of 3-500 µm as used currently.

The negative electrode active material layer is disposed on at least one surface of the current collector, including a silicon-based active material and a conductive material, and containing no binder polymer.

The silicon-based active material may be any one selected from the group consisting of silicon (Si), silicon oxide ($SiO_x$, $0<x\leq 2$) and silicon (Si) alloys, or a mixture of two or more of them.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; or the like. The conductive material may be added in an amount of 0.1-50 wt %, or 2-40 wt % based on 100 wt % of the silicon-based active material. When the content of the conductive material satisfies the above-defined range, it is possible to form an effective conduction network in the negative electrode active material layer, and thus to improve charge/discharge efficiency and cycle characteristics.

According to an embodiment of the present disclosure, the negative electrode active material may consist of include the silicon-based active material and the conductive material. In a variant, the negative electrode active material layer may further include a binder for interconnecting and fixing the silicon-based active material and the conductive material, individually or each other, and assisting the binding of the current collector with the silicon-based active material and the conductive material.

According to the present disclosure, since the negative electrode active material layer includes no binder polymer functioning as resistance in the negative electrode active material layer, it is possible to solve the problem of an increase in resistance advisably. When the negative electrode active material layer includes no binder polymer, a means for fixing and connecting the silicon-based active material while inhibiting volumetric swelling of the silicon-based active material may be required. According to the present disclosure, a coating layer, disposed on the surface of the negative electrode active material layer and using a mixture of polyacrylic acid with polyvinyl alcohol as a coating layer polymer, is formed. Therefore, it is possible to inhibit volumetric swelling of the silicon-based active material in the negative electrode active material layer and to prevent the problem of an increase in resistance caused by the use of a large amount of binder polymer in the conventional negative electrode active material layer by using a smaller amount of coating layer polymer, as compared to the binder polymer used for a negative electrode active material layer. As a result, it is possible to improve the life characteristics of a lithium secondary battery.

The negative electrode according to the present disclosure is provided with a coating layer disposed on the surface of the negative electrode active material layer and in at least a part of the inside of the pores of the negative electrode active material layer, and containing a coating layer polymer forming a chemical bond with silicon (Si) of the silicon-based active material.

The content of the coating layer polymer contained in the coating layer may be 0.3-2 parts by weight, or 0.5-1.5 parts by weight, based on 100 parts by weight of the negative electrode active material layer. When the content of the coating layer polymer satisfies the above-defined range, the coating layer polymer can accept a change in volume of the silicon-based active material, thereby improving cycle characteristics significantly.

The coating layer polymer used according to the present disclosure is a mixture of polyacrylic acid with polyvinyl alcohol. Such a mixed binder (PAA-PVA) of polyacrylic acid (PAA) with polyvinyl alcohol (PVA) can impart higher adhesion as compared to the other binders, such as styrene butadiene rubber (SBR)/carboxymethyl cellulose (CMC), when it is used for a negative electrode including an active material having a high silicon content of about 80%. By virtue of the above-mentioned characteristic, it is possible to accomplish high capacity retention during charge/discharge.

Particularly, the coating layer polymer, polyacrylic acid-polyvinyl alcohol (PAA-PVA) forms chemical bonds (ester bonding between Si and —COOH group of polyacrylic acid, hydrogen bonding between Si and —OH group of polyvinyl alcohol, etc.) with silicon (Si) of the silicon-based active material, while polyacrylic acid and polyvinyl alcohol form a chemical bonding through the reaction between them. In this manner, it is possible to form a three-dimensional gel polymer network. As a result, as compared to a binder simply bound to the Si-based active material and fixing it according to the related art, the coating layer polymer can inhibit volumetric swelling of Si more effectively. The coating layer polymer used according to the present disclosure, i.e. polyacrylic acid and polyvinyl alcohol, is applied to the surface of the negative electrode active material layer in the state of a composition for a coating layer dissolved in a solvent. Then, during the heat treatment in the subsequent drying step, chemical bonding may be formed through the ester bonding between polyacrylic acid and polyvinyl alcohol.

According to an embodiment of the present disclosure, whether the chemical bond is formed between the coating layer polymer and the silicon-based active material or not may be determined through a change in IR peak of a specific functional group of the coating layer polymer before and after the chemical bonding of the coating layer polymer with Si. In other words, when polyacrylic acid and polyvinyl alcohol (PAA-PVA) is used as a coating layer polymer according to the present disclosure, formation of chemical bonds may be judged from a shift of IR peak of —COOH group in PAA from 1720 $cm^{-1}$ to 1730 $cm^{-1}$ upon the chemical bonding between Si and PAA, and between PAA and PVA.

According to an embodiment of the present disclosure, the coating layer polymer may include polyacrylic acid and polyvinyl alcohol at a weight ratio of 9:1-1:9, 2:8-8:2, or 4:6-6:4.

In another aspect of the present disclosure, there is provided a method for manufacturing a negative electrode, including the steps of:

forming a negative electrode active material layer including a silicon-based active material and a conductive material and containing no binder polymer onto at least one surface of a current collector;

coating a composition for a coating layer including a coating layer polymer and a solvent on the surface of the negative electrode active material layer and in at least a part of the inside of the pores of the negative electrode active material layer; and drying the coated composition for a coating layer at 140-190° C. to form a coating layer in which the coating layer polymer forms a chemical bond with silicon (Si) of the silicon-based active material, wherein the content of the coating layer polymer is 0.3-2 parts by weight based on 100 parts by weight of the negative electrode active material layer, and the coating layer polymer is a mixture of polyacrylic acid with polyvinyl alcohol.

Hereinafter, the method for manufacturing a negative electrode according to the present disclosure will be explained in detail.

In the negative electrode according to the present disclosure, the negative electrode active material layer contains no binder polymer. Thus, a mechanical mixture (dry mixture) of the active material with the conductive material may be cast onto a substrate (e.g. Al foil) at a temperature of 70-100° C., 80-100° C., or 90° C., heat treatment may be carried out at a high temperature of 150-350° C., 170-300° C., or 200° C., and then the substrate may be removed to form a negative electrode active material layer. When using Al foil as a substrate, the substrate may be removed through etching by using HCl, or the like.

Then, the composition for a coating layer including a coating layer polymer and a solvent is coated on the surface of the negative electrode active material layer and in at least a part of the inside of the pores of the negative electrode active material layer.

The solvent used for the composition for a coating layer may include water, N-methyl-2-pyrrolidone, or the like.

In the composition for a coating layer, the content of the coating layer polymer may be 0.1-20 wt %, or 0.3-10 wt %, based on the total weight of the composition for a coating layer. When the content of the coating layer polymer satisfies the above-defined range, it is possible to control the viscosity of the composition for a coating layer suitably according to a desired content of coating layer polymer.

The step of coating the composition for a coating layer on the surface of the negative electrode active material layer and in at least a part of the inside of the pores of the negative electrode active material layer may be carried out by any process used conventionally in the art with no particular limitation. For example, the step may be carried out by dip coating, spray coating, die coating, Mayer bar coating, gravure coating or a combination of at least two of them.

Then, the coated composition for a coating layer is dried at 140-190° C. to form a coating layer in which the coating layer polymer forms a chemical bond with silicon (Si) of the silicon-based active material.

According to an embodiment of the present disclosure, the drying step may be carried out by using a dryer, such as a vacuum oven. The drying temperature may be 145-180° C. or 150-170° C. The composition for a coating layer may be heated and dried through the drying step to remove the solvent contained in the composition for a coating layer.

When the drying temperature satisfies 140-190° C., the coating layer polymer contained in the composition for a coating layer forms a chemical bond with silicon (Si) of the silicon-based active material with optimized reactivity. In other words, Si forms an ester bond with —COOH group of polyacrylic acid, while it forms a hydrogen bond with —OH group of polyvinyl alcohol. However, when the drying temperature is lower than 140° C., reactivity is reduced significantly so that the coating layer polymer cannot form a chemical bond with silicon. When the drying temperature is higher than 190° C., side reactions occur due to such an excessively high temperature to cause degradation of the stability of chemical bonding between Si and the coating layer polymer undesirably.

In still another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode, and a separator interposed between the positive electrode and the negative electrode.

The positive electrode may be obtained by mixing a positive electrode active material, conductive material, binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x<0.5$, $0 \leq y<0.5$, $0 \leq z<0.5$, and $0<x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the separator may be a porous polymer film made of a polyolefininc polymer, such as ethylene homopolymer, propylene homopolymer, ethylene-butene copolymer, ethylene/hexene copolymer or ethylene/methacrylate copolymer.

Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonates is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto to finish a secondary battery. Otherwise, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Negative Electrode Active Material and Negative Electrode>

First, Si particles having an average particle diameter of 5 μm as a silicon-based active material and carbon black as a conductive material were dry-mixed at a weight ratio of 70:30, and the resultant mixture was cast onto Al foil as a substrate at a temperature of 90° C., followed by heat treatment at 200° C. Then, the resultant product was etched with HCl to remove Al foil, thereby providing a negative electrode active material layer having a thickness of 30 μm. After that, the negative electrode active material layer was disposed on copper foil having a thickness of 20 μm to prepare a preliminary negative electrode by using a pyrolysis process at a temperature of 1,175° C.

Then, a mixture of polyacrylic acid with polyvinyl alcohol (weight ratio 4:6) as a coating layer polymer was mixed with water as a solvent to prepare a composition for a coating layer. Herein, the content of the coating layer polymer was 1 wt % based on 100 wt % of the composition for a coating layer.

The preliminary electrode was coated with the composition for a coating layer through a dip coating process, and dried at a temperature of 150° C. for 24 hours.

As a result, a negative electrode was obtained, and the negative electrode was provided with a coating layer disposed on the surface of the negative electrode active material layer and in at least a part of the inside of the pores of the negative electrode active material layer, and including a coating layer polymer forming an ester chemical bond with silicon of the silicon-based active material.

Herein, the content of the coating layer polymer was 1 part by weight based on 100 parts by weight of the negative electrode active material layer. In addition, the content of the coating layer polymer in the coating layer was calculated by measuring the weight of the preliminary negative electrode before and after it was dipped in the composition for a coating layer.

<Manufacture of Positive Electrode and Lithium Secondary Battery>

First, $LiCoO_2$ as a positive electrode active material, a conductive material (Denka black) and a binder (PVdF) were introduced to and mixed in N-methyl-2-pyrrolidone (NMP) at a weight ratio of 96.5:2.0:1.5 to prepare positive electrode slurry. Next, the slurry was coated on aluminum foil, followed by pressing and drying, to obtain a positive electrode.

A polyethylene membrane as a separator was interposed between the negative electrode obtained as described above and the positive electrode. In addition, an electrolyte including 1M $LiPF_6$ dissolved in a solvent containing ethylene carbonate (EC):ethyl methyl carbonate (EMC):diethyl carbonate (DEC) at a volume ratio of 3:2:5, and electrolyte additives including 1.5 wt % of vinylene carbonate (VC) and 5 wt % of fluoroethylene carbonate (FEC) based on the total weight of the electrolyte were used to obtain a lithium secondary battery.

Example 2

A negative electrode and a lithium secondary battery including the same were obtained in the same manner as Example 1, except that the solid content of the coating layer polymer was 0.5 wt % based on 100 wt % of the composition for a coating layer and the content of the coating layer polymer was 0.5 parts by weight based on 100 parts by weight of the negative electrode active material layer.

Example 3

A negative electrode and a lithium secondary battery including the same were obtained in the same manner as Example 1, except that the solid content of the coating layer polymer was 1.5 wt % based on 100 wt % of the composition for a coating layer and the content of the coating layer polymer was 1.5 parts by weight based on 100 parts by weight of the negative electrode active material layer.

Comparative Example 1

A negative electrode and a lithium secondary battery including the same were obtained in the same manner as Example 1, except that the step of forming a coating layer was not carried out.

Comparative Example 2

A negative electrode and a lithium secondary battery including the same were obtained in the same manner as Example 1, except that lithium polyacrylate (Li-PAA) was used as a coating layer polymer in the composition for a coating layer, and the content of the coating layer polymer was 1 part by weight based on 100 parts by weight of the negative electrode active material layer.

Comparative Example 3

A negative electrode and a lithium secondary battery including the same were obtained in the same manner as Example 1, except that carboxymethyl cellulose (CMC) was used as a coating layer polymer in the composition for a coating layer, and the content of the coating layer polymer was 1 part by weight based on 100 parts by weight of the negative electrode active material layer.

Comparative Example 4

<Manufacture of Negative Electrode Active Material and Negative Electrode>

First, Si particles having an average particle diameter of 5 μm as a silicon-based active material, carbon black as a conductive material and polyacrylic acid (PAA) as a binder were mixed at a weight ratio of 70:20:10 and water was added thereto to prepare negative electrode slurry. The resultant mixture negative electrode slurry was applied onto copper foil having a thickness of 20 μm at a loading amount of 3.6 mAh/cm². After that, the current collector coated with the slurry was pressed and vacuum-dried at about 130° C. for 8 hours to obtain a preliminary negative electrode.

Then, a mixture of polyacrylic acid with polyvinyl alcohol (weight ratio 4:6) as a coating layer polymer was mixed with water as a solvent to prepare a composition for a coating layer. Herein, the content of the coating layer polymer was 1 wt % based on 100 wt % of the composition for a coating layer.

The preliminary electrode was coated with the composition for a coating layer through a dip coating process, and dried at a temperature of 150° C. for 24 hours. The result is shown in FIG. 1.

Referring to FIG. 1, it can be seen that since the preliminary negative electrode is obtained by using aqueous negative electrode slurry, the binder of the preliminary negative electrode is dissolved in water as a solvent of the composition for a coating layer upon the dipping of the preliminary negative electrode in the composition for a coating layer. Thus, it is not possible to form a coating layer on the preliminary negative electrode so that the negative electrode active material layer comes off the current collector. In addition, it is shown that the surface of the negative electrode active material layer is folded in a significantly large portion and the negative electrode active material layer can be separated from the current collector with ease by using tweezers.

Test for Evaluation of Characteristics (1) Evaluation of Life Characteristics of Lithium Secondary Battery Each of the lithium secondary batteries according to Examples 1-3 and Comparative Examples 1-3 was evaluated in terms of life characteristics.

Particularly, each secondary battery was charged/discharged 50 times at room temperature (25° C.) in a range of operating voltage of 2.5-4.2V under a condition of 0.5C/0.5C, and then capacity retention (%) was calculated according to the following formula to evaluate life characteristics.

Capacity retention (%)=(Discharge capacity after the 50$^{th}$ cycle/Discharge capacity at the first cycle)× 100

The results of life characteristics of each battery are shown in the following Table 1.

(2) Evaluation of Negative Electrode Swelling Ratio

After each of the lithium secondary batteries according to Examples 1-3 and Comparative Examples 1-3 was charged/discharged 50 times to carry out the test of life characteristics as described in the above part (1), each secondary battery was disintegrated to measure the thickness of the negative electrode. The negative electrode swelling ratio was calculated according to the following formula. The results are shown in the following Table 1.

Negative electrode swelling ratio (%)=[(Thickness of negative electrode after 50 charge/discharge cycles-Initial thickness of negative electrode)/(Initial thickness of negative electrode)]×100

TABLE 1

|  | Life characteristics (Capacity retention, %) | Negative electrode swelling ratio (%) |
|---|---|---|
| Example 1 | 92 | 36 |
| Example 2 | 84 | 56 |
| Example 3 | 87 | 44 |
| Comparative Example 1 | 75 | 65 |
| Comparative Example 2 | 82 | 57 |
| Comparative Example 3 | 80 | 60 |

Figure 2:
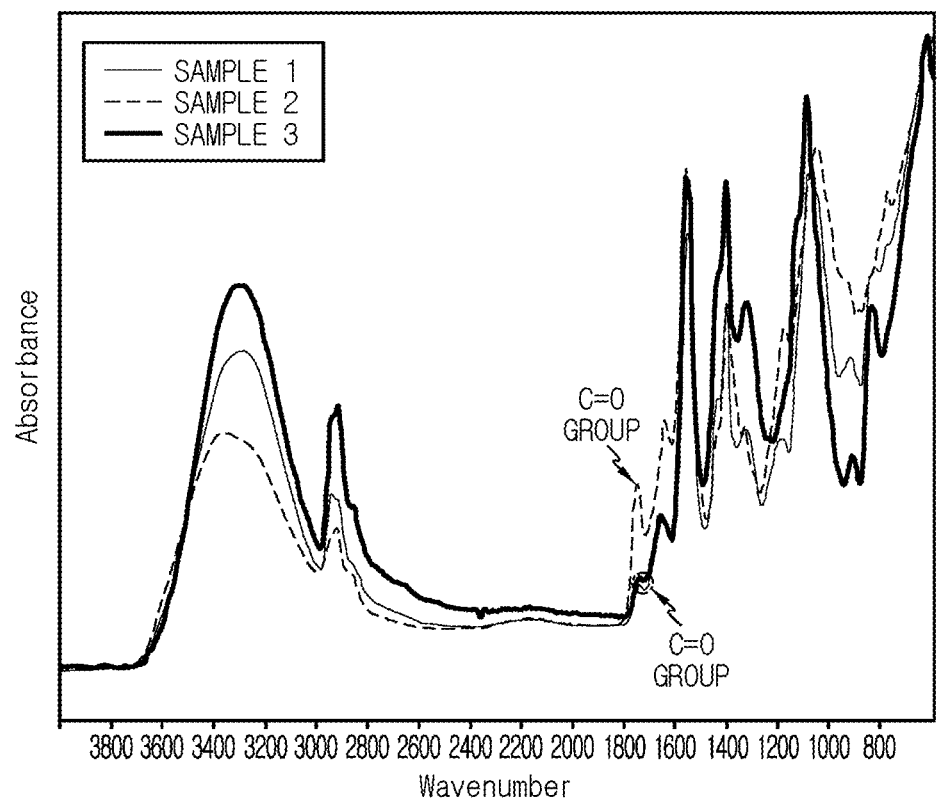
FIG. 2 is a graph illustrating the results of a simulation test for chemical bond formation between silicon (Si) of the silicon-based active material of the negative electrode active material layer and the coating layer polymer in the negative electrode according to an embodiment of the present disclosure.

Referring to Table 1, in the case of each of the secondary batteries according to Examples 1-3 using the negative electrode according to the present disclosure, polyacrylic acid and polyvinyl alcohol as a coating layer polymer in the negative electrode form a crosslinking bond with the silicon-based active material of the negative electrode active material layer, and an ester bond is also formed between polyacrylate and polyvinyl alcohol. Thus, it can be seen that the negative electrode swelling ratio is reduced significantly by improving the problems related with volumetric swelling and durability of the silicon-based compound. In addition, it can be seen that the life characteristics of each lithium secondary battery is significantly improved by forming a coating layer containing the coating layer polymer on the negative electrode active material layer to prevent the problem of an increase in resistance of the negative electrode active material layer itself (3) Determination of Chemical Bonding Between Silicon (Si) and Coating Layer Polymer A simulation test was carried out to determine whether a chemical bonding was formed or not between silicon (Si) of the silicon-based active material and the coating layer polymer in the negative electrode according to an embodiment of the present disclosure. The results are shown in FIG. 2.

Herein, the simulation test was carried out by using attenuated total reflection (ATR) analysis as contact type Fourier Transform Infrared Spectroscopy (FTIR).

Three samples used for the simulation test were prepared as follows.

Sample 1 was obtained by preparing polyacrylic acid as a binder and SiO as a silicon-based active material at a weight ratio of 2:1, adding them to water to a solid content of 1 wt % and carrying out mixing to obtain slurry, casting the slurry onto slide glass with a doctor blade, and carrying out vacuum drying at 100° C.

Sample 2 was obtained in the same manner as Sample 1, except that the drying temperature was 180° C.

Sample 3 was obtained in the same manner as Sample 1, except that the slurry includes no SiO.

Herein, Sample 2 corresponds to a simulation test of an embodiment of the method for manufacturing a negative electrode according to the present disclosure, since it was obtained by drying the slurry of polyacrylic acid with SiO at 180° C. (temperature within the above-defined range of drying temperature, 140-190° C., of the coated composition for a coating layer according to the drying condition of the method for manufacturing a negative electrode according to the present disclosure).

Referring to FIG. 2, it can be seen that the IR peak of —COOH group shifts from 1720 cm$^{-1}$ to 1730 cm$^{-1}$ only in Sample 2 corresponding to a simulation test of an embodiment of the method for manufacturing a negative electrode according to the present disclosure. Thus, it can be seen from the above results that the coating layer polymer forms a chemical bond with silicon (Si) of the silicon-based active material in the negative electrode according to the present disclosure.

What is claimed is:

1. A negative electrode comprising:
   a current collector;
   a negative electrode active material layer disposed on at least one surface of the current collector, comprising a silicon-based active material and a conductive material, and containing no binder polymer; and
   a coating layer disposed on a surface of the negative electrode active material layer and at least a part of inside of pores of the negative electrode active material layer, and containing a coating layer polymer forming a chemical bond with silicon (Si) of the silicon-based active material,
   wherein a content of the coating layer polymer is 0.3-2 parts by weight based on 100 parts by weight of the negative electrode active material layer, and
   the coating layer polymer comprises a mixture of polyacrylic acid with polyvinyl alcohol.

2. The negative electrode according to claim 1, wherein the content of the coating layer polymer is 0.5-1.5 parts by weight based on 100 parts by weight of the negative electrode active material layer.

3. The negative electrode according to claim 1, wherein the coating layer polymer comprises polyacrylic acid and polyvinyl alcohol at a weight ratio of 9:1-1:9.

4. The negative electrode according to claim 1, wherein the negative electrode active material layer consists essentially of the silicon-based active material and the conductive material.

5. A method for manufacturing a negative electrode, comprising:

forming a negative electrode active material layer comprising a silicon-based active material and a conductive material and containing no binder polymer onto at least one surface of a current collector;

coating a composition for a coating layer comprising a coating layer polymer and a solvent on a surface of the negative electrode active material layer and at least a part of inside of pores of the negative electrode active material layer; and drying the coated composition for a coating layer at 140-190° C. to form a coating layer in which the coating layer polymer forms a chemical bond with silicon (Si) of the silicon-based active material, wherein a content of the coating layer polymer is 0.3-2 parts by weight based on 100 parts by weight of the negative electrode active material layer, and the coating layer polymer comprises a mixture of polyacrylic acid with polyvinyl alcohol.

6. The method for manufacturing a negative electrode according to claim 5, wherein the content of the coating layer polymer is 0.5-1.5 parts by weight based on 100 parts by weight of the negative electrode active material layer.

7. The method for manufacturing a negative electrode according to claim 5, wherein the negative electrode active material layer consists essentially of the silicon-based active material and the conductive material.

8. The method for manufacturing a negative electrode according to claim 5, wherein the coating is carried out through dip coating, spray coating, die coating or a combination of at least two thereof.

9. A lithium secondary battery comprising the negative electrode according to claim 1.

* * * * *